(12) United States Patent
Schwab et al.

(10) Patent No.: US 6,392,796 B1
(45) Date of Patent: May 21, 2002

(54) CHANGEOVER SYSTEM FOR OPTICAL COMPONENTS

(75) Inventors: Klaus Schwab, Heidenheim; Ralph Aschenbach, Hofgersmar, both of (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/584,014

(22) Filed: May 30, 2000

(30) Foreign Application Priority Data

May 28, 1999 (DE) .......................................... 199 24 686

(51) Int. Cl.⁷ .............................. G02B 21/00; G02B 7/02
(52) U.S. Cl. ...................... 359/380; 359/368; 359/384; 359/821
(58) Field of Search ...................... 359/368, 380–384, 359/821

(56) References Cited

U.S. PATENT DOCUMENTS

| | | | | |
|---|---|---|---|---|
| 2,720,138 A | * | 11/1955 | Michel et al. | ............... 359/384 |
| 3,488,109 A | * | 1/1970 | Sperlich | ...................... 359/821 |
| 4,486,078 A | * | 12/1984 | Hashimoto et al. | ......... 359/821 |
| 4,544,236 A | * | 10/1985 | Endo | ............................ 359/384 |
| 5,128,808 A | | 7/1992 | Dosaka | ....................... 359/821 |
| 5,617,260 A | * | 4/1997 | McNiven et al. | ........... 359/821 |
| 5,684,624 A | * | 11/1997 | Wieber et al. | .............. 359/384 |

FOREIGN PATENT DOCUMENTS

| | | | |
|---|---|---|---|
| DE | 2 316 386 | 2/1973 | |
| RU | 1472860 | * 4/1989 | ................. 359/821 |

* cited by examiner

*Primary Examiner*—Thong Nguyen

(57) ABSTRACT

The invention relates to a changeover system for optical components such as filters, reflectors, polarizers and lens systems in optical equipment, particularly microscopes, a so-called reflector revolving nosepiece. The elements carrying the optical components, the so-called reflector blocks, are held by spring force against precision stops on the revolving nosepiece. For this purpose, the reflector blocks have lateral flanges that are respectively held against precision stop surfaces on the revolving nosepiece, by two respective leaf springs. The direction of the spring forces is mutually inclined, so that an outer edge of the flange is pressed into the interior edge formed on the revolver by two mutually perpendicular surfaces. The invention makes possible a rapid and simple fitting and changeover of reflector blocks without the use of tools.

37 Claims, 2 Drawing Sheets

CHANGEOVER SYSTEM FOR OPTICAL COMPONENTS

CROSS-REFERENCE TO RELATED APPLICATIONS

Not applicable.

STATEMENT REGARDING FEDERALLY SPONSORED RESEARCH OF DEVELOPMENT

Not applicable.

BACKGROUND OF THE INVENTION

1. Field of the Invention

The invention relates to a changeover system for optical components such as filters, reflectors, polarizers or lens systems in optical equipment, particularly microscopes. Such changeover systems are used to make possible in microscopy, for example, different illumination processes and/or contrast processes, or different after-magnifications. Such changeover systems usually have either a slider which is displaceable perpendicularly to the beam paths, or a revolving nosepiece, seated rotatably on the microscope stand, on which the elements carrying the different optical components are replaceably seated. Different elements, which are fitted with different lens combinations, reflectors, or filters, can then be selectively brought into the beam path by a changeover of the slider or the revolving nosepiece.

2. Discussion of Relevant Art

In the changeover systems known heretofore, the elements fitted with different optical components are received on the slider or revolving nosepiece by means of dowels and screws or, as described in DE 23 16 386, by means of clampable dovetail guides. This kind of seating leads to a constructionally expensive construction both of the changeover system, i.e., the slider or revolving nosepiece, and also of the reflector elements or filter elements. In addition, the fitting of the changeover system is relatively time-consuming, and a tool is required.

SUMMARY OF THE INVENTION

The present invention has as its object a changeover system for optical components in optical equipment, which simplifies the fitting or the changing of elements to which the optical components are fitted. The invention is in particular to be usable as a reflector changer and/or filter changer.

This object is attained according to the invention by a changeover system for optical components in optical equipment, in particular microscopes, comprising a plurality of elements carrying respectively different optical components, wherein said elements are held by spring force against stops of the changeover system.

According to the present invention, the elements to which different optical components such as reflectors, filters, polarizers, or magnification systems are fitted are held by spring force against precision stops of the changeover system. It has surprisingly been found that a reproducibility which is suitable even for the requirements of high-powered microscopes can be attained by relatively simple spring loading of the elements, and that this reproducibility is maintained even during mechanical movement of the changeover system.

Simple leaf springs can be provided to produce the spring force.

The elements to which the optical components are fitted are generally denoted hereinbelow as, reflector blocks, and preferably have two respective flanges, which are pressed by the springs against two parallel angles on the changeover system. The angles on the changeover system can then be respectively formed by two mutually perpendicular surfaces. Two leaf springs are then preferably allocated to each flange, with their force directions oriented at an angle to each other which is not equal to 90°. The force direction of the stronger spring is then to act in the direction of the diagonals of the associated flange, so that the flange is pressed into the angle of the changeover system by means of this stronger spring. The weaker spring then presses the flange against one of the two surfaces, associated with the flange, of the changeover system.

The changeover system according to the invention can in particular be constructed as a rotatable nosepiece. The stops of the changeover system are then preferably provided on columns which extend parallel to the direction [sic] of rotation of the revolving nosepiece. The columns can then be provided respectively between the changeover positions of the revolving nosepiece, adjacent to the light passage openings, so that each column has the stops for two adjacent seating positions for reflector blocks. The columns are then preferably provided in the peripheral region of the revolving nosepiece, i.e., the distance of the columns from the rotation axis of the revolving nosepiece is greater than the distance of the midpoints of the light passage openings of the changeover system from the rotation axis of the revolving nosepiece. An optimum close-set arrangement of the seating positions for the reflector blocks on the revolving nosepiece can thereby be attained, so that an optimum furthermore results for changeover positions of the revolving nosepiece, for a predetermined revolving nosepiece diameter and a predetermined space requirement for each reflector block.

BRIEF DESCRIPTION OF THE DRAWINGS

Details of the invention are further explained hereinbelow with reference to the preferred embodiment shown in the Figures. In detail.

DETAILED DESCRIPTION OF THE PREFERRED EMBODIMENTS

Figure 1:
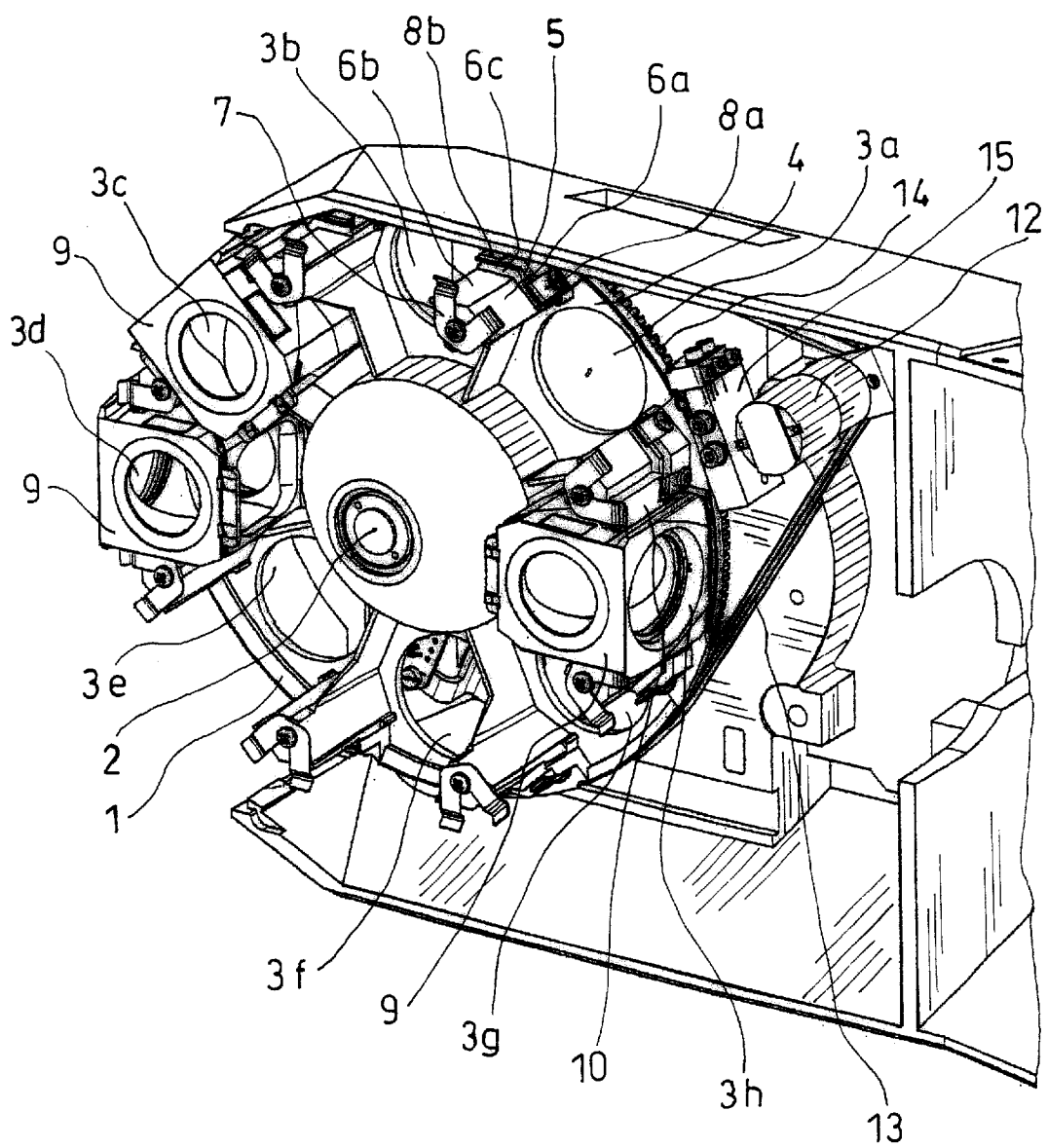
FIG. 1 shows a perspective view of a changeover system according to the invention.

The changeover system (1) in FIG. 1 has a revolving disk (4), which is rotatable about a middle axis (2). The revolving disk (4) has on its peripheral edge a toothing (14) which is engaged by the teeth of a toothed belt (13) driven by a motor (12). The changeover system furthermore has a detent (15) by means of which it is insured that the rotary movement is stopped at a defined changeover position after each rotation of the revolving disk (4).

Furthermore, the revolving disk (4) has in all 8 light passage openings (3a–3h), which are arranged with their midpoints on a circle around the rotation axis (2) of the revolving disk (4), and which respectively define a changeover position of the revolving disk (4.). In the situation shown in FIG. 1, the seating positions for reflector blocks are unoccupied at five changeover positions (3a, 3b, 3e, 3f and 3g), while the seating positions for reflector blocks are fitted with reflector blocks (9) at three changeover positions (3c, 3d and 3h). The reflector blocks are constructed in a substantially cubic shape, and have three light passage openings, two of which are mutually coaxial and one is perpendicular to the two others.

A column (5) is provided between each two light passage openings of the revolving disk (4). Each of these columns is of identical construction. The columns (5) differ from each other only in their respective rotated arrangement corresponding to the rotation angle between two changeover positions of the revolving disk (4).

Each of the columns (5) has two flanges (6a, 6b), which are directed radially outward and thus parallel to the rotation axis (2) of the revolving nosepiece. The angle between these two surfaces (6a, 6b) then corresponds to the rotation angle of the revolving disk (4) between two changeover positions. The surface (6a) of the column (5), adjacent to a light passage opening (3a) of the revolving disk (4), then serves as an abutment surface for a reflector block to be seated in the seating position defined by this light passage opening (3a). The surface (6b) of the column (5), adjacent to the adjacent light passage opening (3b), correspondingly serves as the abutment surface for a reflector block to be seated in the seating position defined by the adjacent light passage opening (3b). The distances of the radially outward directed abutment surfaces (6a, 6b) from the rotation axis of the revolving nosepiece are then greater than the distance of the midpoints of the light passage openings (3a–3h) from the rotation axis of the revolving nosepiece.

Each of the columns has two further abutment surfaces (6c), which are perpendicular to the two radially outward directed abutment surfaces (6a, 6b) of the column (5). The abutment surfaces (6a, 6c) respectively associated with a seating position for reflector blocks correspondingly form an interior angle of 90°.

A respective two columns arranged on opposite sides of each light passage opening have mutually parallel abutment surfaces, so that a reflector block seated in a seating position defined by the light passage opening abuts with two flanges (10) against abutment surfaces, which are aligned parallel to each other, on two columns (5).

Two first leaf springs (8a, 8b) are seated on the column (5), and their force directions are directed perpendicular to the respective radially outward directed abutment surfaces (6a, 6b). Furthermore, a double leaf spring (7) formed in a V-shape is seated on the column end. The surface shape of both shanks of the V-shaped double leaf spring (7) are themselves also again formed in a V-shape, so that a flange (10) of a reflector block (9), to be seated on the abutment surfaces (6a, 6b), is pressed diagonally into the interior angle formed by two abutment surfaces (6a, 6b) which are respectively mutually perpendicular, and thus an exterior angle of the flange (10) is pressed into the interior angle formed by two mutually perpendicular abutment surfaces (6a, 6b).

Instead of a single double leaf spring (7), two single leaf springs can of course be provided, each of which is constituted like each of the two shanks of the double leaf spring. The use of two single leaf springs is found to be particularly advantageous for revolving nosepieces with a small number of changeover positions, and for sliders as the changeover system.

Figure 3A:
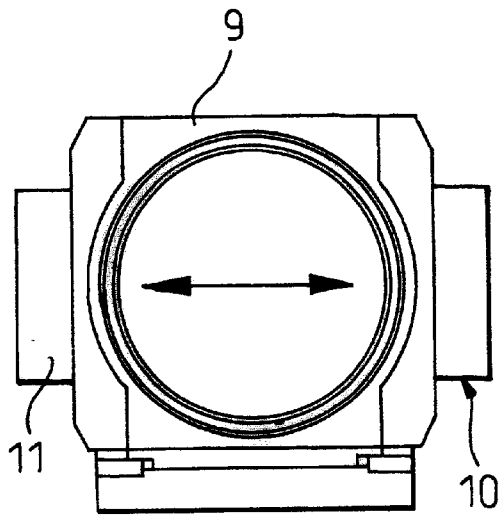
FIGS. 3a and 3b show the view of an embodiment example for a reflector block, from two mutually perpendicular directions.
Figure 3B:
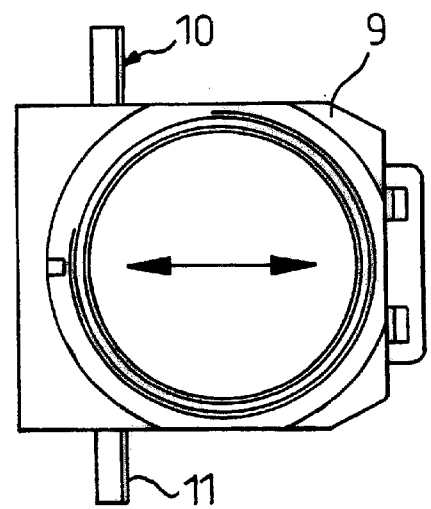

The reflector blocks to be seated on the changeover system are shown in FIGS. 3a and 3b. They essentially consist of two housing halves which together form a cube-shaped hollow body (9) with three circular openings for the passage of light. Each of the two housing halves corresponds to a half cube cut along a surface diagonal. The optical components are arranged in the interior of the hollow body, for example, a mirror extending parallel to the angle bisector for use as a reflector, or, in the case of a filter, filter glasses extending parallel to the cube faces. For use as a magnification changer, lens groups which together form a telescope are provided parallel to the light passage openings. Laterally outside the cubic hollow body, mutually opposite sides of the hollow body are provided with two flanges (10, 11). The one housing half of the reflector block (9) which has the flanges (10, 11) can be produced by pressure diecasting, only the surfaces of the flanges (10, 11) which serve to seat the reflector blocks, and the seatings and/or abutment faces for the optical components, being precision machined thereafter. The second housing half is a plastic part which has relatively low precision and which serves only to hold filters or to press reflectors against abutment surfaces of the other housing portion.

The flanges (10, 11) are made symmetrical to the midpoints of the light passage openings, and are arranged correspondingly symmetrical of the related housing part, so that the reflector blocks can be seated in the revolving nosepiece, according to the case of application, with equal precision in two positions which are rotated by 180°.

Figure 2:
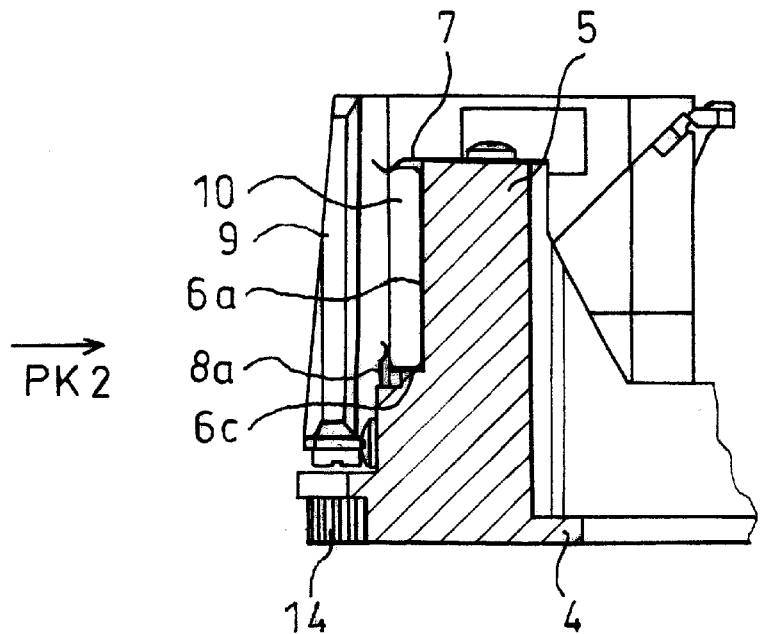
FIG. 2 shows a portion of the changeover system in FIG. 1, in section.

The fitting of the changeover system with reflector blocks can be explained as simply as possible with reference to FIG. 2. The reflector block (9) to be seated is first fitted on the two columns associated with the seating position, with one respective edge of each of the two flanges (10, 11) behind the leaf springs (8a) adjacent to the revolving disk (4). The reflector block (9) is then held, rotated through about 10° with respect to the final seating position around an axis which is perpendicular to the plane of the drawing in FIG. 2. In order to facilitate the insertion of the edges of the flanges (10, 11), the free end of the leaf spring (8a) is bent away from the abutment surface (6a) of the columns (5). The insertion of the flanges (10, 11) consequently takes place against the spring force of the leaf springs (8a). The leaf springs (8a) press in the direction of the arrow PK2 against the flanges (10, 11) and press these against the outward-directed abutment surfaces (6a) of the columns (5) on opposite sides of the light passage opening.

Following this, a rotation of the reflector block around an axis perpendicular to the plane of the drawing in FIG. 2 takes place. Firstly, the second leaf springs (7) of two columns (5), the said springs (7) being formed in a V-shape at their free ends, are deflected against their spring force. Upon a further rotation of the reflector block (9), the tips of the V of the leaf springs (7) slide over the edges of the flanges (10, 11) and press the flanges (10, 11) against the short abutment surfaces (6c), oriented perpendicular to the rotation axis of the revolving nosepiece, of both columns. In the end position shown in FIG. 2, the abutment surfaces of the flanges (10,11) abut on the abutment surfaces (6a, 6b) of the columns (5). The shape and length of the leaf springs (7) is then chosen in dependence on the dimensions of the flanges (10, 11) such that in the end position of the flanges (10, 11) the forces exerted by the leaf springs (7) on the flanges respectively act in the direction of the interior edges formed by the two abutment surfaces (6a, 6c) which are mutually perpendicular. This force direction is indicated by the arrow PK1 in FIG. 2. It is insured by the corresponding constitution of the springs (7, 8a) and the force directions of the springs that the flanges (10, 11) always abut in the same reproducible position on the abutment surfaces (6a, 6b) of the columns (5), even when vibrations occur which are unavoidable during a changeover of the revolving nosepiece. With correspondingly precise constitution of the abutment surfaces (6a, 6c) and of the corresponding opposing surfaces of the flanges (10, 11), a reproducible accuracy of ±0.01 mm is attained on changeover of the reflector blocks or assembling and disassembling them. The angular accuracy of the seating lies within one minute of arc. In order to attain this accuracy, the revolving disk (4), including the columns (5), can be a pressure die casting, only the abutment surfaces (6a, 6b, 6c) of the columns (5) remaining to be precision machined subsequently.

The spring clamping according to the invention of the reflector blocks onto the changeover system makes possible a rapid and simple fitting of the reflector blocks to the changeover system or a replacement of the reflector blocks. Tools are not required for this.

What is claimed is:

1. A changeover system for optical components in optical equipment comprising:
    a plurality of elements carrying respectively different optical components,
    wherein said plurality of elements are held by spring force against stops of the changeover system, and
    wherein each element of said plurality of elements has flanges that are pressed against angles on the changeover system formed by two respective mutually perpendicular surfaces, and
    wherein two springs, are allocated to each of said flanges and have spring force directions inclined to each other at an angle not equal to 90°.

2. The changeover system according to claim 1, wherein said springs comprise leaf springs for generating said spring force.

3. The changeover system according to claim 1, wherein said flanges are arranged laterally of each element and laterally project beyond said element.

4. The changeover system according to claim 1, further comprising a revolving nosepiece.

5. The changeover system according to claim 4, wherein said stops are arranged at columns that extend parallel to a rotation axis of said revolving nosepiece.

6. The changeover system according to claim 5, further comprising light passage openings with midpoints, wherein the distance of each of said columns from said rotation axis is greater than the distance of said midpoints of said light passage openings from said rotation axis.

7. The changeover system according to claim 1, further comprising a motor drive for changing-over the changeover system.

8. The changeover system according to claim 1, wherein said optical components comprise at least one of reflectors, filters, polarizers, and telescopic lens systems.

9. The changeover system according to claim 1, wherein each element of said plurality of elements comprise light passage openings, and wherein said flanges are arranged symmetrically of said light passage openings, so that each element is seatable on the changeover system in two positions rotated through 180°.

10. The changeover system according to claim 1, wherein each element of said plurality of elements comprises two housing halves and said flanges are arranged on one of said housing halves.

11. A changeover system for optical components in optical equipment, comprising:
    a plurality of columns each having at least two respectively mutually perpendicular surfaces forming interior angles,
    a plurality of springs providing spring forces,
    a plurality of elements carrying respectively different optical components, each element of said plurality of elements comprising flanges defining exterior angles,
    wherein said exterior angles of said flanges are pressed into said interior angles of said columns by said plurality of springs.

12. The changeover system according to claim 11, wherein said plurality of springs comprise a plurality of leaf springs for generating said spring forces.

13. The changeover system according to claim 11, wherein said plurality of springs comprises two leaf springs allocated to each of said flanges and having spring force directions inclined to each other at an angle not equal to 90°.

14. The changeover system according to claim 11, wherein said flanges are arranged laterally of each element of said plurality of elements and laterally project beyond each element.

15. The changeover system according to claim 11, further comprising a revolving nosepiece.

16. The changeover system according to claim 15, wherein stops are arranged at columns that extend parallel to a rotation axis of said revolving nosepiece.

17. The changeover system according to claim 16 further comprising light passage openings on said revolving nosepiece, wherein said columns are arranged between said light passage openings.

18. The changeover system according to claim 17, wherein adjacent columns of said plurality of columns have parallel surfaces.

19. The changeover system according to claim 17, wherein each said light passage opening has a midpoint, and
    wherein the distance of said columns from said rotation axis of said revolving nosepiece is greater than the distance of said midpoints of said light passage openings from said rotation axis.

20. The changeover system according to claim 17, wherein said flanges are arranged symmetrically of said light passage openings, so that each of said plurality of elements is seatable in the changeover system in two positions rotated through 180°.

21. The changeover system according to claim 11, further comprising a motor drive for changing-over the changeover system.

22. The changeover system according to claim 11, wherein said optical components comprise at least one of reflectors, filters, polarizers, and telescopic lens systems.

23. The changeover system according to claim 11, wherein each element of said plurality of elements comprises two housing halves and said flanges are arranged on one of said housing halves.

24. The changeover system according to claim 11, wherein one of said plurality of springs is formed in a V-shape having a free end and is dimensioned such that when said element is seated, an edge of said flanges abuts on a flank of one of said leaf springs remote from said free end of said V-shape.

25. A changeover system for optical components comprising:
    a revolving nosepiece having a rotation axis and having a plurality of light passage openings, each light passage opening having a mid-point,
    a plurality of elements carrying respectively different optical components,
    each element of said plurality of elements having flanges,
    said revolving nosepiece having a plurality of columns, said plurality of columns defining stops for said flanges of said plurality of elements, wherein the distance of each of said plurality of columns from said rotation axis is larger than the distance of the mid-point of said plurality of light passage openings from said rotation axis.

26. The changeover system according to claim 25, further comprising a plurality of leaf springs for generating spring forces for holding said plurality of elements.

27. The changeover system according to claim 25, wherein said flanges comprise two respective mutually perpendicular surfaces.

28. The changeover system according to claim 25, comprising two leaf springs allocated to each of said flanges, said two leaf springs having spring force directions inclined to each other at an angle not equal to 90°.

29. The changeover system according to claim 25, wherein said flanges are arranged laterally of each element of said plurality of elements and laterally project beyond said element.

30. The changeover system according to claim 25, wherein said plurality of columns extend parallel to said rotation axis of said revolving nosepiece.

31. The changeover system according to claim 25, wherein said plurality of columns are arranged between light passage openings of respectively adjacent changeover positions of said revolving nosepiece.

32. The changeover system according to claim 25, wherein adjacent columns of said plurality of columns have parallel stops.

33. The changeover system according to claim 25, further comprising a motor drive for changing-over the changeover system.

34. The changeover system according to claim 25, wherein said optical components comprise at least one of reflectors, filters, polarizers, and telescopic lens systems.

35. The changeover system according to claim 25, wherein said flanges are arranged symmetrically to said light passage openings, so that each element of said plurality of elements is seatable on the changeover system in two positions rotated through 180°.

36. The changeover system according to claim 25, wherein each element of said plurality of elements comprises two housing halves and said flanges are arranged on one of said housing halves.

37. The changeover system according to claim 25, wherein one of said plurality of springs is formed in a V-shape having a free end and is dimensioned such that when an element of said plurality of elements is seated, an edge of said flanges abuts on a flank of one of said leaf springs remote from said free end of said V-shape.

* * * * *